United States Patent
Chong et al.

(10) Patent No.: US 6,205,557 B1
(45) Date of Patent: Mar. 20, 2001

(54) REDUNDANT CALL PROCESSING

(75) Inventors: Koan S. Chong, East Brunswick; Martin C. Dolly, Lanoka Harbor; Andrew R. Jacob, Ocean; Carolyn R. Johnson; Wonseok Lee, both of Atlantic Highlands; David George Lewis, Freehold; Pamela M. Moricz, Aberdeen; Mark A. Ratcliffe, Oakhurst, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/093,921

(22) Filed: Jun. 9, 1998

(51) Int. Cl.[7] .............................. H02H 3/05; H04M 3/00
(52) U.S. Cl. .............................. 714/4; 379/272; 379/279
(58) Field of Search .................................... 714/4, 10, 11; 379/272, 279, 9, 10; 707/204; 709/238, 239, 240

(56) References Cited

U.S. PATENT DOCUMENTS

| | | | |
|---|---|---|---|
| 5,442,691 | * | 8/1995 | Price et al. ............................ 379/200 |
| 5,592,530 | * | 1/1997 | Brockman et al. .................... 379/34 |
| 5,736,933 | * | 4/1998 | Segal ............................. 340/825.44 |
| 5,799,156 | * | 8/1998 | Hogan et al. ........................ 709/237 |
| 5,848,128 | * | 12/1998 | Frey ........................................ 379/1 |
| 5,875,242 | * | 2/1999 | Glaser et al. ........................ 379/207 |
| 5,896,441 | * | 4/1999 | Akazawa et al. ........................ 379/9 |
| 5,933,474 | * | 8/1999 | Kipp ........................................ 379/1 |
| 5,974,114 | * | 10/1999 | Blum et al. .............................. 379/9 |
| 6,016,334 | * | 1/2000 | Kasrai .................................... 379/15 |

* cited by examiner

Primary Examiner—Thomas Black
Assistant Examiner—Mary Wang

(57) ABSTRACT

A telecommunications network includes at least an active and a standby call server, the standby call server becoming active upon failure of the active call server. To facilitate rapid switch-over from the active to the standby call server and to prevent the loss of call processing data for calls in the call setup stage, the active call server sends call information to the standby call server during intervals in which the active call server is awaiting subsequent signaling messages from elements of the telecommunications network. In this way, the standby call server has the call information needed to commence call processing upon failure of the active call server, and the active call server makes efficient use of time while awaiting a reply signaling message.

24 Claims, 6 Drawing Sheets

REDUNDANT CALL PROCESSING

BACKGROUND OF THE INVENTION

1. Field of Invention

The invention relates to redundant call processing. In particular, the invention relates to a method and apparatus for copying call information expeditiously and in a way that allows in-progress call processing to continue if an active call processor fails.

2. Description of Related Art

To assure reliability, redundancy is often built into telecommunications networks. Most network equipment, including call processors and databases, are duplicated to provide greater reliability in the event of equipment failure. For example, active call processors are backed-up by duplicate equipment, referred to as a standby call processor. Call processors are used during the call set-up stage (i.e., the time from call initiation to establishing the call connection) to process information, transmit instructions regarding routing, allocate network resources, approve the call and the billing, and gather further information where needed. If the active call processor fails, the standby call processor can take over to process new incoming calls.

To perform properly, the standby call processor must have the same information that is available to the active call processor. Thus, the standby call processor is periodically updated and the data synchronized with that of the active call processor. Generally, wherever network data is duplicated, it is periodically updated and synchronized. However, periodic updating is a problem when failure occurs between the updates. Thus, new technology is needed to reduce the effects of the failures between the updates.

SUMMARY OF THE INVENTION

This invention provides a redundant call processing system that ensures call processing in the event of a failure of an active call server by maintaining in a standby call server the same information regarding the call as the active call server. In a telecommunications network, an active call server is backed up by a standby call server. The active call server receives an initial signaling message from an interface server to initiate a call. The active call server processes the initial signaling message and generates call information for the call. This information includes, but is not limited to, the content of the signaling message received; registers containing transient data about the call, such as counter and timer values; customer identification; and customer data and logic, for example. The active call server may then send a request back to the interface server requesting more information regarding the call. When the request is sent, the active call server copies the call information and sends the copy to the standby call server.

The interface server periodically determines if the active call server has failed. If the active call server has not failed, the interface server sends subsequent signaling messages to the active call server. However, if the active call server has failed, the interface server sends the subsequent signaling messages to the standby call server. In this way, the telecommunications network can insure, in the event of a failure of the active call server, that calls that have been initiated, but not established, will be established.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Modern call processing relies heavily on database queries. Currently, many calls rely on database queries during the call setup stage. These include calls such as automated collect calls, 800 number calls, 900 number calls, and prepaid calling card calls, among others. Even many routine calls now rely on information contained in network databases for call processing. For example, determining whether a customer has a valid account is typically done via a database query and fraud control methods commonly involve database queries during call setup.

Figure 1:
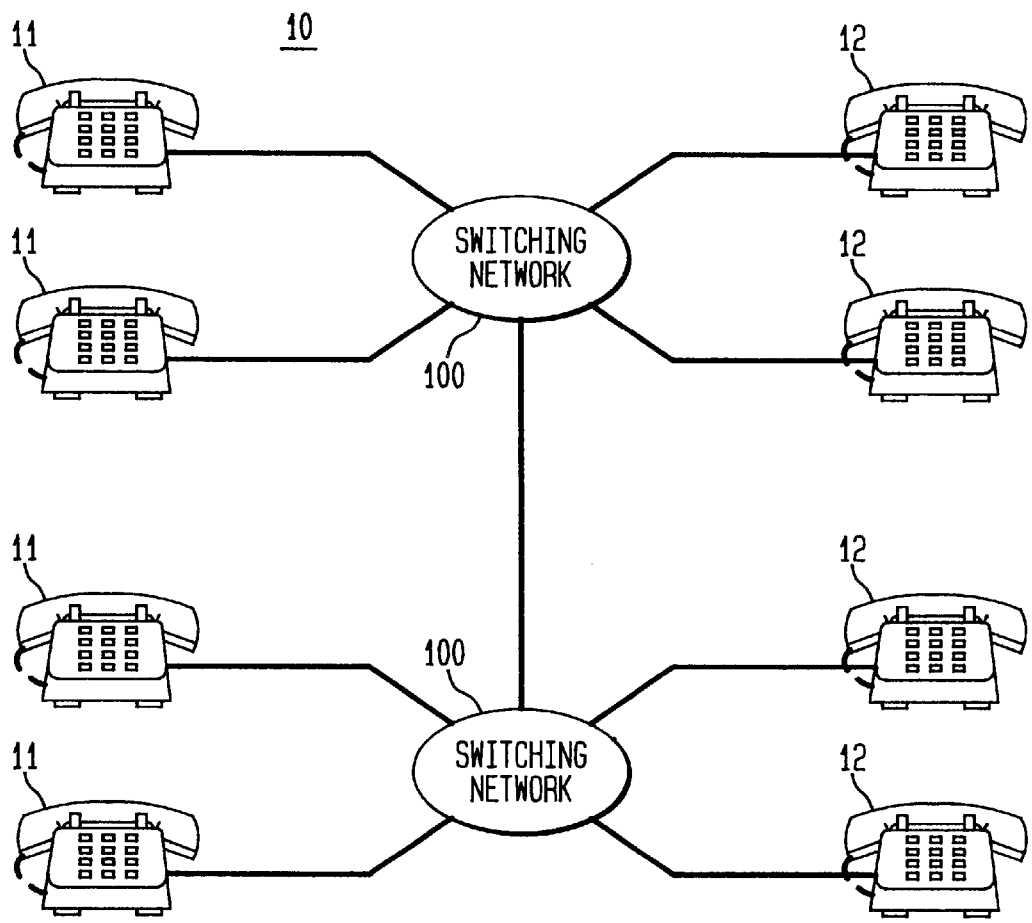
FIG. 1 illustrates a telecommunications network.

FIG. 1 shows a telecommunications network 10 according to the invention. Calls are placed from communications devices, such as telephones 11 to other communications devices, such as telephones 12. The calls are routed through switching networks 100, that are used to complete call connections.

Figure 2:
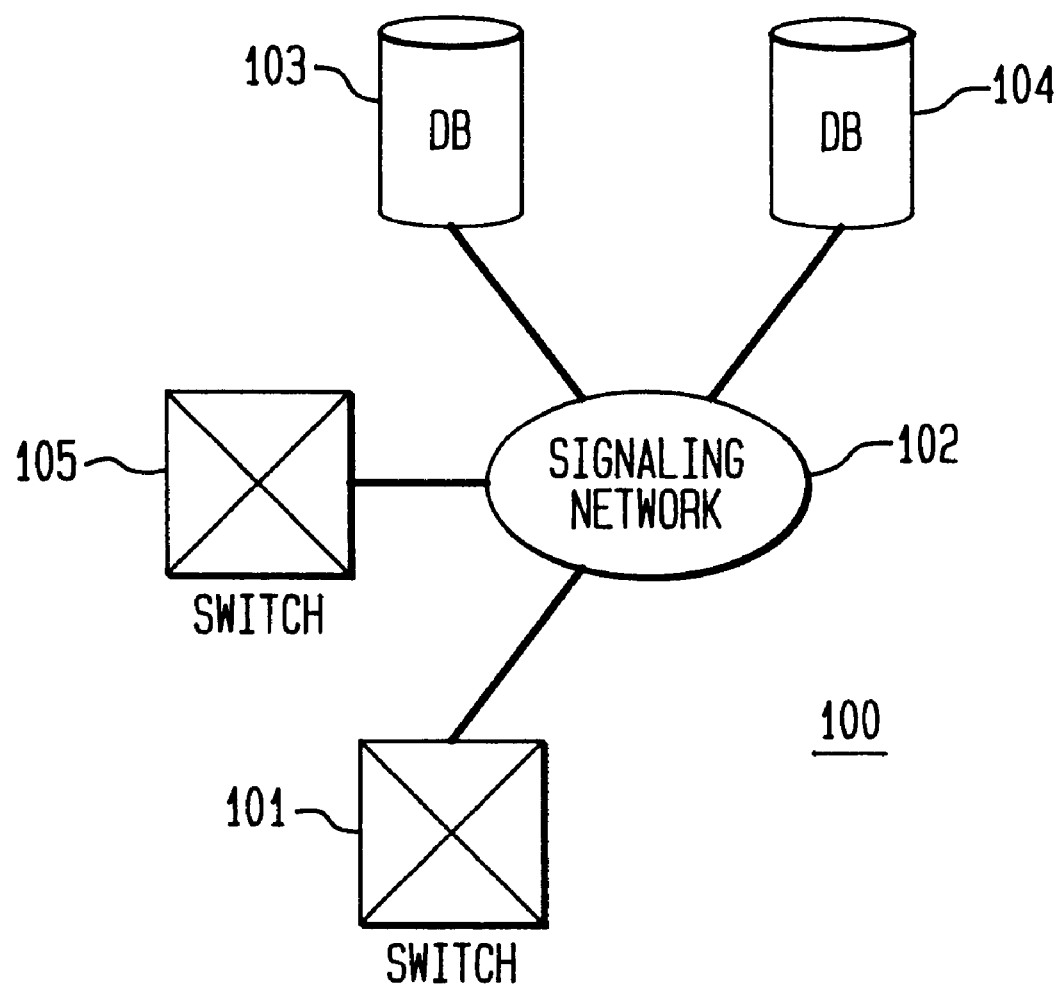
FIG. 2 illustrates a switching network.

FIG. 2 shows an exemplary switching network 100 for processing telephone calls, including executing database queries. A telephone switch 101 connects calling parties to called parties. The switch 101 also transmits call information to a database 103 via the signaling network 102, which may be preferably implemented using an AT&T SS7 signaling network, capable of transferring information between databases. For example, a telephone call from a calling party is received at the switch 101. The switch 101 relays call information, such as the telephone number, to the database 103 via the signaling network 102. As will be discussed later, the database 103 is a complex processor that manages and analyzes call information. The switching network 100 may include a plurality of databases such as databases 103 and 104, and one or more switches such as switch 101 and switch 105. The database 103 evaluates the call information and returns instructions via the signaling network 102 to the switch 101, to complete the call connection. The database 103 my also in turn execute triangular signaling by interrogating the database 104 for the necessary call information, and return that information to switch 101.

Figure 3:
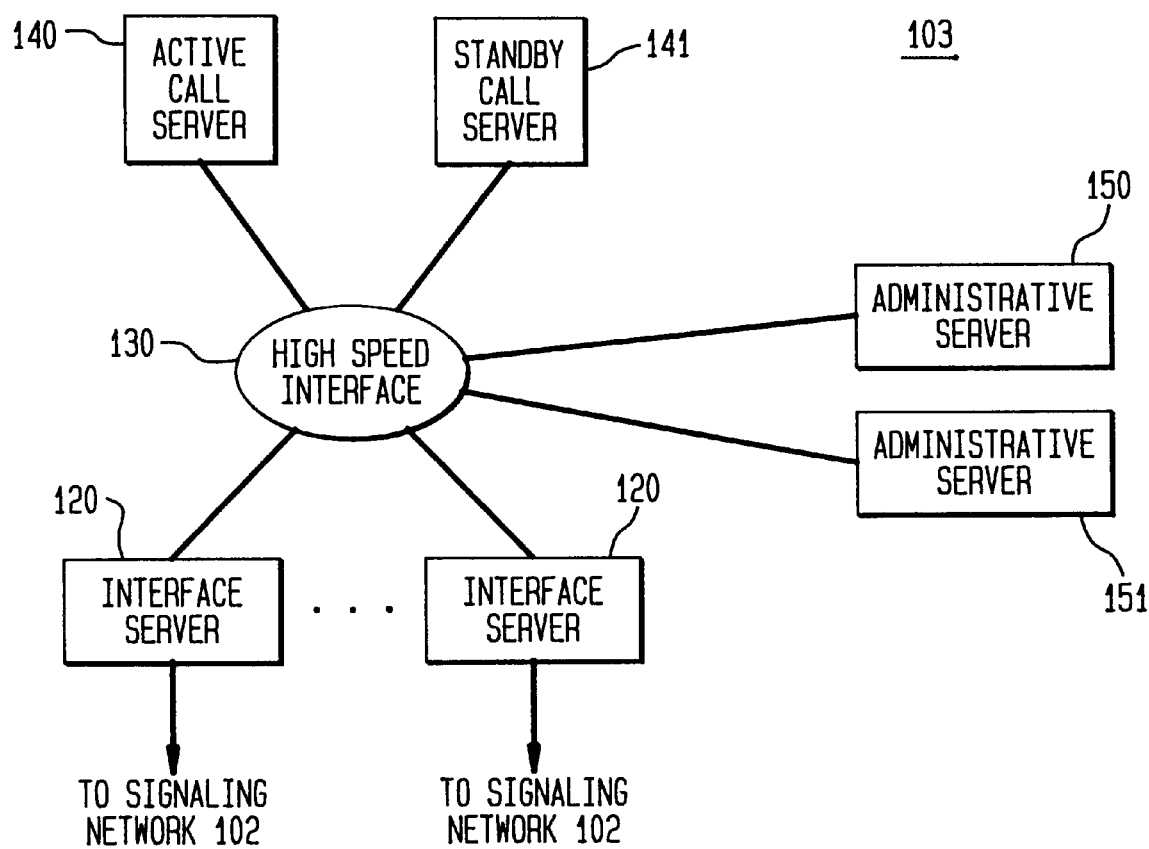
FIG. 3 illustrates a distributed database architecture.

FIG. 3 shows the database 103 in more detail. The database 104 is identical to the database 103, and the following description of the database 103 applies equally to the database 104. The database 103 includes a plurality of interface servers 120, an active call server 140 and a backup call server 141. The interface servers 120 and the active and backup call servers 140 and 141, respectively, are coupled together by a high speed interface 130. Also as shown in FIG. 3, the database 103 includes administrative servers 150 and 151. The administrative servers 150 and 151 will be described later in more detail.

Incoming call information, or signaling messages, from the signaling network 102 are received by one of the plurality of interface servers 120. The interface servers 120 perform initial processing of the caller information, such as ensuring that all expected bits are received and that the call information is properly formatted. The interface server 120 then forwards the signaling message to the active call server 140 via the high speed interface 130. The high speed interface 130 may be a local area network (LAN), for example. The call server 140 processes the signaling message and returns a response with directions to the interface server 120, based on the processing results. The interface server 120 in turn returns the response to the switch 101 through the signaling network 102.

As shown in FIG. 3, the database 103 may include the standby call server 141. In one embodiment, the standby call server 141 is used to backup the active call server 140 in the event of a failure of the active call server 140. Thus, the standby call server 141 does not process signaling messages from any of the plurality of interface servers 120 until a failure of the active call server 140 occurs.

In an alternative embodiment, each of the call servers 140 and 141 can process signaling messages and formulate call information, thus sharing the call processing load. In this case, the call servers 140 and 141 act as the standby call server for each other. That is, the call server 140 backs up the call server 141 and also acts as an active call server and the call server 141 backs up the call server 140 and also acts as an active call server.

Figure 4:
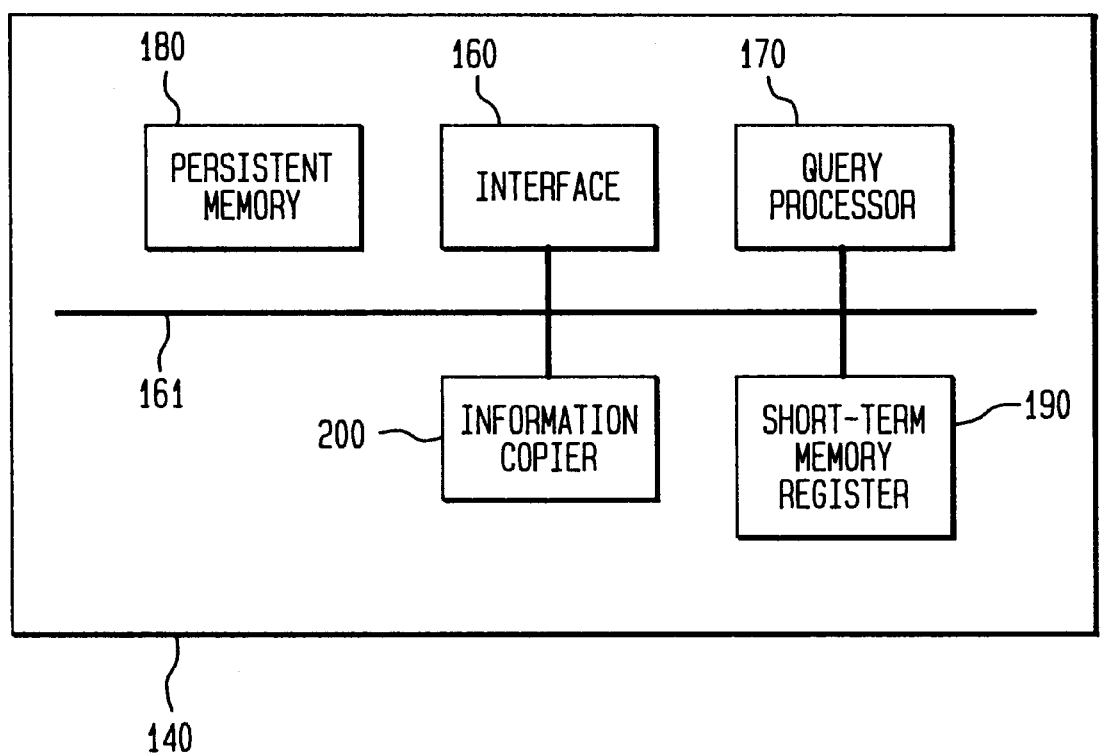
FIG. 4 is a block diagram of a call server.

FIG. 4 shows the active call server 140 in more detail. An interface 160 receives signaling messages from the high speed interface 130. The interface 160 then sends the signaling message to a query processor 170 via a two-way signal bus 161. The query processor 170 reviews the context of the signaling message, and compares the context to data stored in a persistent memory 180. For example, an initial signaling message may include a telephone number of the called party, such as an 800 number. Associated with the 800 number may be specific routing instructions. For example, the routing instructions could direct the call to be routed to Tulsa on weekends and Chicago on weekdays. The query processor 170 determines how the signaling message is to be processed based on the context of the call information in the persistent memory 180. In the example above, the query processor 170 determines the day of the week. If the day of the call was a Saturday, for example, the query processor 170 issues routing instructions to route the call to Tulsa.

In another example, the signaling message could include an 800 number to connect the caller to an 800 service. The 800 service could include a menu of options for the caller to choose from such as "press 1 for orders, press 2 for billing inquiries, press three to talk to a representative." On receipt of the signaling message containing the 800 number, the query processor 170 searches the persistent memory 180 for data related to the 800 number and retrieves the selected option menu. Then, the query processor 170 may direct the switch 101 to provide the option menu in an audio format to the caller, for example.

After receiving the initial signaling message, the query processor 170 creates call information for the call. The call information may include a transaction register, received initial and subsequent signaling messages and response messages, for example. The transaction register may include specific routing information for the call and a transaction identification, for example. The query processor 170 then stores the call information in a short-term memory register 190. Because the call information contains information needed to complete the call connection, if it is copied to the backup call processor 141, the call connection may be completed, even in the event of a failure of the active call processor 141. This is most important when the call is a complex call requiring multiple transactions between the switch and the database.

If the call is a simple call (i.e., one in which the call connection can be completed using only one signaling message and one response), the query processor 170 will delete the call information from the register 190 upon determining that the response message has been successfully sent.

If a fault occurs in the active call server 140 between the time that the initial signaling message is received and a response is returned to the switch 101, the call connection may fail. However, in the case of the simple call, the waiting time between receipt of the initial signaling message and sending the response is very short, and thus a failure is not likely.

In the event of a complex call (ie., one in which several signaling messages and responses may be required to complete the call connection), the query processor 170 must process additional signaling messages and formulate additional responses. As the additional signaling messages are received at the active call server 140, the query processor 170 updates the call information by adding additional data to current call information, modifying the current call information and replacing the current call information with a new set of call information, for example. The updated call information is then stored in the register 190.

An information copier 200, under control of the query processor 170, copies the call information that is stored in the register 190 and forwards the thus-copied call information to the interface 160. Thus, when call information is created or updated, the query processor 170 directs the information copier 200 to make a copy of the call information and forward it to the interface 160. The interface 160 then transmits the copy of the call information to the standby call server 141.

The standby call server 141 is identical to the active call server 140. Thus, the copied call information from the active call server 140 is stored in the register 190 of the standby call server 141.

The query processor 170 determines that the connection is established by means of its internal logic or by means of a message received by the active call server from the switch 101. The query processor 170 then deletes the call information from the register 190 and sends a message to the standby call server 141 to also delete the call information for that call. In the example of a simple call, the query processor 170 deletes the call information from the register 190 when the call connection is completed. Because the call information was not copied to the backup call server 141, the query processor 170 does not send a delete message to the backup call server 141.

The copying and transfer of the call information is possible in the case of complex transactions because the active call server 140 "waits" for a significant portion of the time interval between signaling messages. For example, the total interval in which the active call server 140 is actively processing a signaling message may be on the order of 100 milliseconds. The waiting period (i.e., approximately the time from sending the response to receipt of the next signaling message) may be on the order of seconds, tens of seconds or minutes. Because the active call server 140 is waiting, and the call information is unchanging during the waiting period, sufficient time is available to copy the call information and forward it to the standby call server 141.

As long as the active call server 140 is functioning normally, signaling messages will be processed in the active call server 140 and the call information copied to the standby call server 141. However, in the event of a failure of the active call server 140, the database 103 must be reconfigured in order to continue processing any calls that are still in the setup stage.

Figure 5:
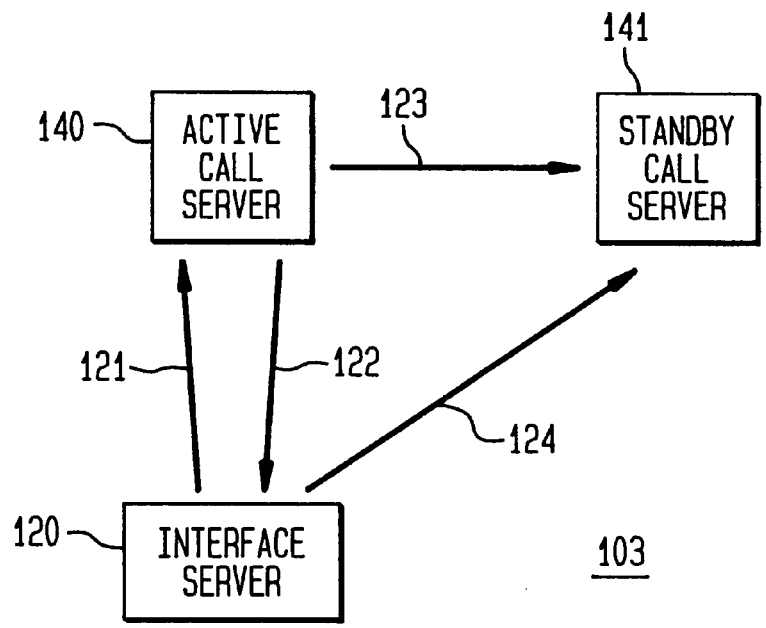
FIG. 5 shows the operation of the call servers in the event of a failure.

FIG. 5 shows the operation of the database 103 in the event of a failure of the active call server 140. In the illustrated example, a failure of the active call server 140 occurs after receipt of the initial signaling message and return of the response and before receipt of the next signaling message. In FIG. 5, the interface server 120 sends an initial signaling message 121 to the active call server 140. The active call server 140 processes the initial signaling message 121, and determines that further input is needed from the switch 101 or from another database in the switching network 100. The active call server 140 sends a response 122 to the interface server 120 and creates the call information for the call. The call information is then copied and a copy 123 is forwarded to the standby call server 141.

At some time subsequent to the receipt of the response, the interface server 120 determines that the active call server 140 has failed. The interface server then designates the standby call server 141 as the new active call server. The interface server 120 then sends a subsequent signaling message 124 associated with the call to the call server 141. Because the call information was copied to the call server 141, the call server 141 is able to correctly process subsequently received signaling messages and to return call handling instructions to the switch 101 to complete establishing the call. When the call connection is established at the switch 101, the call server 141 will then delete the call information associated with that call from the register 190.

In the above discussion, the copy 123 is presumed to be transmitted to the standby call server 141 before the active call server 140 fails. However, if the copy 123 is not transmitted before the failure, the call connection cannot be completed.

Figure 6:
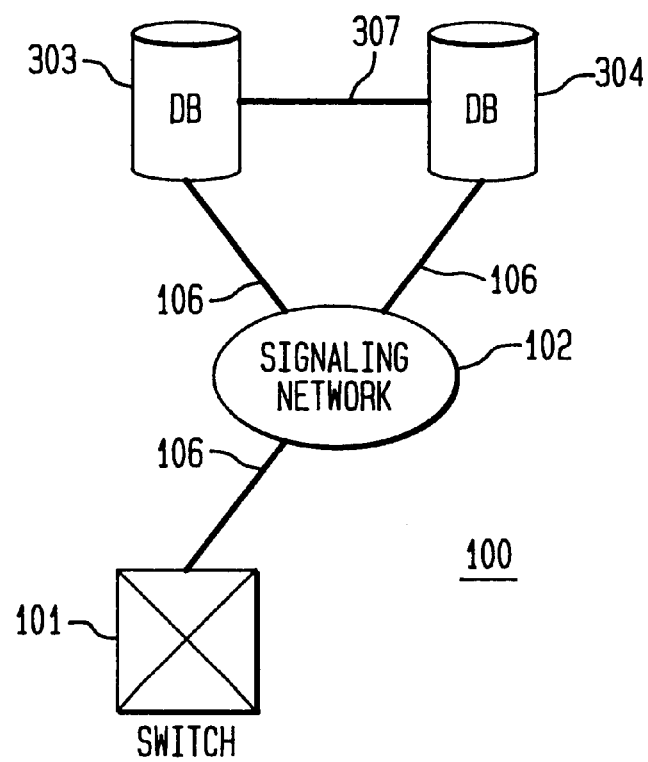
FIG. 6 illustrates an alternate embodiment of the telecommunications network.

FIG. 6 shows another embodiment of the switching network 100 according to the invention. In FIG. 6, the switch 101 receives signaling messages and forwards the signaling messages to the signaling network 102 via the transmission line 106. The signaling network 102 forwards the signaling messages to an active database 303. The switching network 100 also includes a standby database 304. The database 303 contains one or more call servers that receive signaling messages from the switch 101 and send back response messages when more data is required from the switch 101 or from another database in the switching network 100. The call server in the database 303 creates the call information for the call, copies the call information and forwards the call information to the standby database 304 over a transmission line 307. The transmission line 307 could be a dedicated wide area network, the signaling network 102 or a standard T1 or T3 line, for example, as long as the data transmission speed is sufficient to transmit the call information during the waiting period between sending a response and receiving the subsequent signaling message. If the active database 303 fails, the call can continue to be processed by the switching network 100 because the standby database 304 maintains up-to-date call information for the call.

Returning to FIG. 3, administrative servers 150 and 151 perform functions such as updating static information contained in the persistent memory 180 of the active call server 140. For example, if a user of the telecommunications network desires to change call routing for an 800 number on the weekends from Tulsa to Topeka, the administrative server 150, for example, would receive the request and would send a message to the active call server 140. The active call server 140 would then copy this information and forward it to the persistent memory 180 in the standby call server 141. In this way, the static data contained in the persistent memories 180 of the active call server 140 and the standby call server 141 are maintained current. Alternately, the administrative server 150 could send the same message to both the active call server 140 and the standby call server 141.

Figure 7:
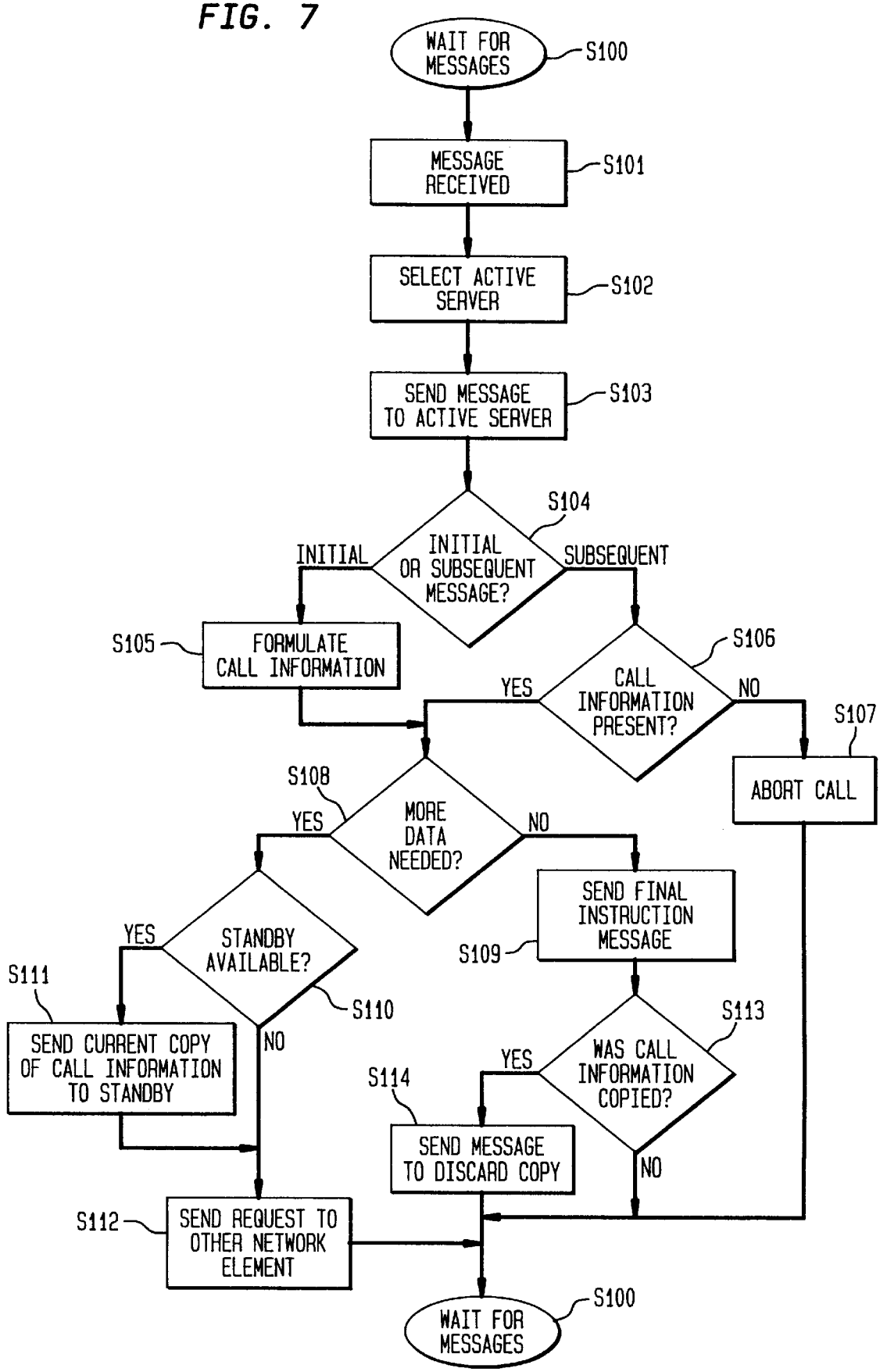
FIG. 7 is a flowchart illustrating the operation of the distributed database architecture of FIG. 3.

FIG. 7 is a flowchart illustrating the operation of the database 103 of FIGS. 3 and 4. The process begins in step S100. In step S101, the interface server 120 receives a message. The message may be an initial signaling message or a subsequent message. The process then moves to step S102. In step S102, the interface server 120 selects an active call server 140. The process then moves to step S103. In step S103, the interface server 120 sends the message to the active call server 140. The process then moves to step S104.

In step S104, the query processor 170 determines if the message is an initial signaling message or a subsequent message. If the message is the initial signaling message, the process moves to step S105. If the message is a subsequent message, the process moves to step S106. In step S105, the query processor formulates call information. The process then moves to step S108.

In step S106 the query processor determines if call information is present. If call information is present, the process moves to step S108. Otherwise, the process moves to step S107. In step S107, the active call server 140 aborts the call. The process then returns to step S100.

In step S108, the query processor 170 determines if more data is needed. If more data is needed, the process moves to step S110. Otherwise the process moves to step S109. In step S109, the query processor 170 sends a final instruction message to the interface server 120. The process then moves to step S113. In step S113, the query processor 170 determines if the call information was copied. If the call information was not copied, the process moves to step S100 and waits for messages. Otherwise, the process then moves to step S114. In step S114, the query processor 170 of the active call server 140 sends a message to the standby call server 141 to discard the copy of the call information. The process then moves to step S100 and waits for messages.

In step S110, the query processor 170 of the active call server 140 determines if a standby call server is available. If a standby call server is not available, the process moves to step S112. Otherwise, the process moves to step S111.

In step S111, the query processor 170 of the active call server 140 sends a current copy of the call information to the standby call server 141. The process then moves to step S112. In step S112, the interface server 120 sends a request to the switch 101 or other network element for additional information. The process then moves to step S100 and waits for messages.

As shown in FIG. 4, the query processor 170 is preferably implemented on a programmed general purpose computer. However, the query processor 170 can also be implemented on a special purpose computer, a programmed microprocessor or micro controller and peripheral integrated circuit elements and ASIC or other integrated circuit, additional signal processor, a hard wire electronic or logic circuit such as a discrete element circuit, a programmable logic device such as APLD, PLA, FPGA or PAL or the like. In general, any device capable of implementing a finite state machine for implementing a flowchart shown in FIG. 7 can be used to implement the query processor 170.

While this invention has been described in conjunction with the specific embodiments outlined above, it is evident that many alternatives, modifications and variations will be apparent to those skilled in the art. Accordingly, the preferred embodiments and the invention as set forth above are intended to be illustrative, not limiting. Various changes may be made without departing from the spirit and scope of the invention as defined in the following claims.

What is claimed is:

1. A method for providing redundant call processing, comprising:
   receiving first data from a network interface to initiate call processing for a call in a first unit;
   generating second data based on the first data as part of the call processing;
   transmitting the second data based on the first data as part of the call processing; and
   transmitting the second data to a second unit before completing the call processing, wherein the second data is transmitted to the second unit when a request is sent by the first unit to request additional data for that call.

2. The method of claim 1, further comprising:
   processing the first data to generate call information; and
   saving the call information in a memory, wherein the second data is a copy of the call information.

3. The method of claim 2, further comprising:
   transmitting a response from the first unit to the interface, the response requesting the additional data regarding the call, the additional data including at least one of additions to the call information, modification of the call information and an entire new set of call information replacing the call information;
   receiving the additional data for the call from the interface;
   processing the additional data to obtain updated call information; and
   transmitting a copy of the updated call information as updated second data to the second unit, the updated call information being copied before receipt of subsequent data for the call.

4. The method of claim 3, further comprising:
   monitoring the first unit for faults; and
   directing the subsequent data to the second unit if a fault is detected in the first unit.

5. The method of claim 4, wherein the first unit is a first database and the second unit is a second database.

6. The method of claim 4, wherein the first unit is a first call processor and the second unit is a second call processor.

7. The method of claim 1, further comprising saving the first data in a memory, wherein the second data is a copy of the first data.

8. A method for establishing reliable call processing in a telecommunications network, comprising:
   receiving a first message corresponding to a call from a caller in a first server;
   processing the first message to obtain information;
   returning a first response to the first message; and
   copying the call information to a second server after a request is sent by the first server for additional data for the call.

9. The method of claim 8, further comprising:
   receiving the second message in the first server;
   updating the call information;
   returning a second response to the second message; and
   copying the updated call information to the second server during a time between receipt of the second message and receipt of a subsequent message, wherein the updated call information includes at least one of additional call information, modified call information and a complete set of new call information replacing the call information.

10. The method of claim 9, further comprising:
    receiving a final message in the first server;
    returning a final response from the first message; and
    instructing the second server to discard the updated call information.

11. The method of claim 9, wherein the first message, the second message and the subsequent messages each contain call processing request data.

12. The method of claim 9, wherein the first, the second and the subsequent messages are processed in accordance with data contained in a first database of the first server, the data in the first database being updated based on inputs from a caller, the first server sending the updated data to the second server, the second server storing the updated data in a second database.

13. The method of claim 12, wherein the call processing request data includes one of the telephone number, a billing code and a call destination option.

14. The method of claim 8, further comprising:
    detecting a failure of the first server; and
    transferring call processing to the second server.

15. The method of claim 14, wherein the transferring step includes receiving subsequent messages in the second server.

16. The method of claim 14, wherein the step of detecting the failure includes:
    sending a monitoring message to the first server; and
    awaiting a response, the failure being declared in the absence of the response.

17. The method of claim 14, wherein the step of detecting a failure includes:
    monitoring for a response to a signaling message; and
    declaring a failure in the absence of the response to the signaling message.

18. The method of claim 8, further comprising:
    saving the first message in a memory; and
    copying the first message to the second server.

19. An apparatus for providing redundant call processing, comprising:
    a first unit; and
    a second unit in communication with the first unit, wherein the first unit receives first data to initiate call processing for a call, generates second data based on the first data as part of the call processing, and transmits the second data to the second unit when a request is sent by the first unit to request additional data for that call.

20. The apparatus of claim 19, the first unit including a first memory, the first unit processing the first data to generate call information and saving the call information in the first memory, the second unit including a second memory, the second unit saving the second data in the second memory, wherein the second data is a copy of the call information.

21. The apparatus of claim 20, further comprising an interface coupled to the first and the second units, the first unit transmitting a response to the interface, the response requesting the additional data regarding the call, the first unit receiving the additional data and processing the additional data to obtain updated call information, the first unit transmitting a copy of the updated call information as updated second data to the second unit, the updated call information being copied before receipt of subsequent data for the call.

22. The apparatus of claim 21, wherein the interface monitors the first unit for faults, the interface transferring the subsequent data to the second unit if a fault is detected in the first unit.

23. The apparatus of claim 22, wherein the first unit is a first database and the second unit is a second database.

24. The apparatus of claim 22, wherein the first unit is a first call processor and the second unit is a second call processor.

* * * * *